Sept. 16, 1969  R. A. McELROY  3,467,452

SPHERICAL BEARING ASSEMBLY

Filed Sept. 15, 1967

INVENTOR.
RUSSELL A. McELROY
BY

United States Patent Office 3,467,452
Patented Sept. 16, 1969

3,467,452
SPHERICAL BEARING ASSEMBLY
Russell A. McElroy, Guelph, Ontario, Canada, assignor to
Electrohome Limited, Kitchener, Ontario, Canada
Filed Sept. 15, 1967, Ser. No. 667,909
Int. Cl. F16c 27/00, 35/00, 9/06
U.S. Cl. 308—26       10 Claims

ABSTRACT OF THE DISCLOSURE

A spherical bearing assembly, including a seat for a spherical bearing and a spherical bearing seated therein. The spherical bearing is maintained in the seat by a resilient annular member which seats against the spherical bearing and has its two opposite halves bent in the direction away from the seat to bear resiliently against a fixed member spaced from the seat.

---

This invention relates generally to spherical bearing assemblies, in which a spherical bearing is adapted to be received in a seat with which it has surface or line contact. The bearing has a bore within which a rotating shaft is received. The bearing itself does not rotate about the rotational axis, but can shift in such a way that the direction of the rotational axis may be changed. More particularly, this invention relates to the way in which the spherical bearing is maintained in the bearing seat.

It will be appreciated that the means employed to bias the bearing resiliently into the bearing seat must be such as to permit changes in the direction of the rotational axis. Some prior art assemblies, particularly those employing a coil spring which bears at one end against a hold-down plate and at the other end against an annular ledge cut directly in the spherical bearing, have the disadvantage that the spring tends to place a lop-sided force on the bearing, thereby causing the bearing to lay off its proper rotational axis. This results in misalignment with the shaft axis and undue wear during rotation of the shaft within the assembly. Designs employing coil springs which bear against floating seats on the spherical bearing are not limited in their alignment ability, but have the disadvantage that the coil springs tend to become tangled with one another prior to assembly and require to be separated for assembly. Designs incorporating coil springs are not suited for automated assembly, and this is a further disadvantage. Another prior art design involves a floating seat on the bearing, and a washer-like element having a flat, annular portion seating squarely on the floating seat and radially outwardly projecting fingers curving away from the spherical bearing and pressing resiliently against a holddown plate. In this kind of assembly the washer-like element is not intended to shift its orientation, but rather the spherical bearing is intended to change its rotational axis direction by sliding within the floating seat. There are variations of this latter design, but all of them require some sort of floating seat relationship with the bearing, which in turn requires that the bearing be spherical at its point of contact with the spring, and the increased spherical surface of the bearing increases its cost.

In view of the above disadvantages of prior art assemblies, it is an object of this invention to provide a spherical bearing assembly which employs a minimum of parts, and uses a simple and inexpensive spring member adapted to permit full accommodation by the spherical bearing of changes in the direction of its axis.

Accordingly, this invention provides a bearing assembly comprising: a first member having a seat for a spherical bearing, a spherical bearing seated in said seat, said spherical bearing having a spherical surface where it is in contact with said seat and being provided with annular ledge means facing away from said seat, a second member located adjacent said bearing remote from said first member, a resilient substantially annular member having a substantially circular inner periphery and seated on said bearing with said inner periphery engaging said annular ledge means, opposite halves of said substantially annular member being bent in the direction away from said first member such that the annular member bears resiliently against said second member at two antipodal locations on the outer periphery of the annular member to provide a first fulcrum and bears resiliently against said annular ledge means at two antipodal locations on the inner periphery of the annular member to provide a second fulcrum disposed at right-angles to said first fulcrum.

Two embodiments of this invention are shown in the accompanying drawings, in which like numerals refer to like parts throughout the several views, and in which.

Figures 1, 2:
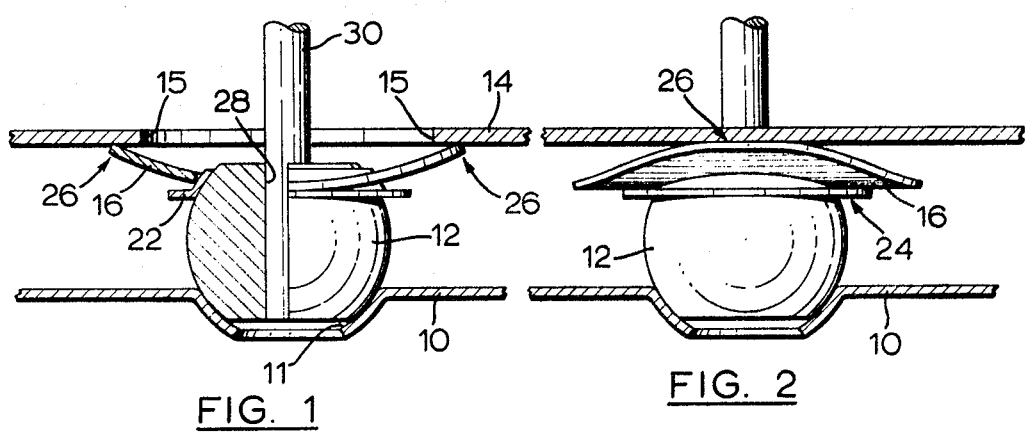
FIGURE 1 is an axial sectional view of the spherical bearing assembly according to a first embodiment of this invention, half of the bearing being shown in elevation.
FIGURE 2 is a part-section, part-elevational view of the spherical bearing assembly of FIGURE 1, taken at right-angles to the view of FIGURE 1.
Figures 3, 4:
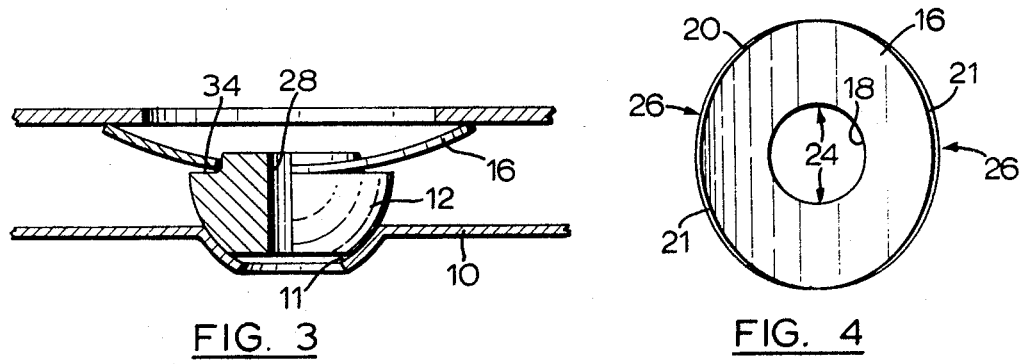
FIGURE 3 is a sectional view of a spherical bearing assembly according to a second embodiment of this invention, part of the spherical bearing being shown in elevation.
FIGURES 4 and 5 are plan views of two possible designs for the resilient spring employed in the assemblies of FIGURES 1, 2 and 3.

Turning now to FIGURE 1, the spherical bearing assembly according to a first embodiment of this invention is seen to include a first plate member 10 having a spherical bearing seat 11, in which is seated a bearing 12. The bearing 12 is spherical except for removed cap portions at the bottom and top, and the surface of the spherical bearing 12 has a radius of curvature identical to that of the spherical bearing seat 11, such that surface contact is achieved between the two. A second plate member 14 is located adjacent the bearing 12 remote from the first plate member 10, and has an aperture 15. A resilient, substantially annular member 16 constitutes a spring which resiliently urges the bearing 12 into the bearing seat 11. FIGURE 4 shows the annular member 16 in plan. The annular member 16 has a circular inner periphery 18 and a circular outer periphery 20. The annular member 16 is curved to define a cylindrical surface, as can be seen in FIGURE 1, and it is for this reason that the outer periphery 20 appears slightly elliptical in FIGURE 4. Because of this curvature, the edge portions 21 are visible at opposed portions of the outer periphery 20 in FIGURE 4.

A floating seat 22 is provided to seat against the spherical surface of the bearing 12 and constitutes annular ledge means against which the inner periphery 18 of the annular member 16 can seat. In actual fact, due to the curvature of the annular member 16, the inner periphery 18 bears against the floating seat 22 at only two antipodal locations 24. The annular member 16 bears resiliently against the second plate member 14 at two antipodal locations 26 on the outer periphery 20. The antipodal locations 26 constitute a first fulcrum about which the annular member 16 can pivot in one plane, and the antipodal points 24 constitute a second fulcrum disposed at right-angles to the first fulcrum, the annular member 16 also being adapted to pivot about the points 24 in a second plane at right-angles to the first plane. Because the floating seat 22 and the annular plate member 14 are close together, the two fulcrums can be considered to lie almost in the same plane, and therefore to constitute a kind of universal joint.

The bearing 12 has an inner bore 28 within which a shaft 30 is adapted to rotate.

Figures 5, 6:
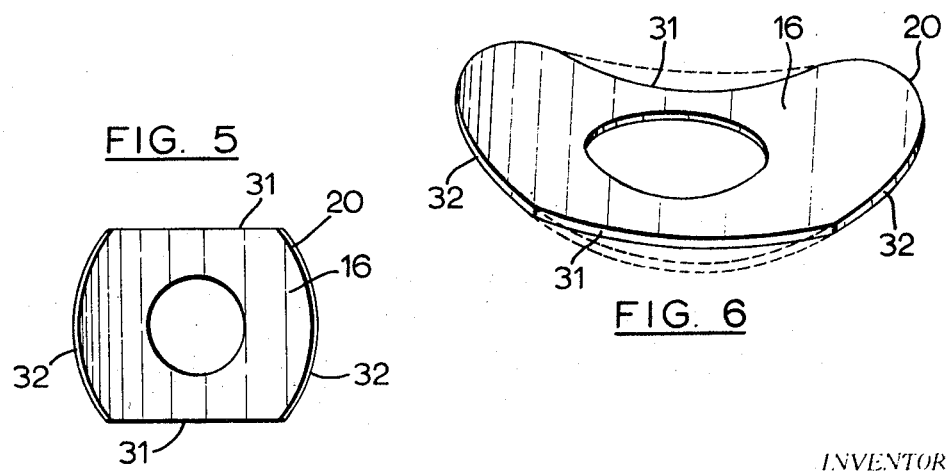
FIGURE 6 is a perspective view of the resilient spring shown in FIGURE 5.

FIGURE 5 shows another shape for the resilient member 16. In FIGURE 5, the outer periphery 20 of the annular member 16 includes two rectilinear portions 31 between the portions 32 of circular curvature. In FIGURE 6, the annular member 16 of FIGURE 5 is shown in perspective, and dotted lines represent the boundaries that the annular member 16 would have if its outer periphery were circular.

FIGURE 3 shows a second embodiment of this invention, which differs from the first in that the floating seat 22 has been dispensed with. In its place, the bearing 12 is provided with an annular ledge 34, and the annular member 16 bears directly against the bearing 12. Because of the universal joint effect achieved by the provision of two mutually perpendicular fulcrums, the bearing 12 is able to accommodate considerable deviation in the direction of its rotational axis. No shaft is shown in FIGURE 3.

In this invention, it is essential that the two mutually perpendicular fulcrums be provided in order that the universal joint effect can be achieved, but it is not important what kind of curvature the annular member 16 is given to achieve the two fulcrum effect. Although the annular member 16 is shown and described above as having a cylindrical curvature, it would be equally satisfactory to provide it with a flattened V-shape in cross-section, or to give it some other shape which would result in the two perpendicular fulcrums. Also, the shape or outline of the outer periphery 20 of the annular member 16 need not be exactly as shown in FIGURES 4 and 5. In the first place, the portions surrounding the locations 26 need not be circular in curvature, or if circular, they need not have the same centre of curvature. However, they should definitely be curved, since without some curvature the fulcrum effect could not be attained. Since the portions of the outer periphery 20 between the operative locations 26 do not enter into the operation of the annular member 16, they can be of any shape or outline consistent with providing the required resilience. For example, the outline of the annular member 16 could be oval or elliptical and work satisfactorily.

It should be noted, however, that the shape of the inner periphery 18 of the annular member 16 should be substantially circular, in order to permit it to seat on either the floating seat 22 or the ledge 34 without appreciable lateral movement.

Although the bearing seat shown and described above has a spherical surface, whereby surface contact is achieved between the bearing and the seat, it is equally possible to provide, in the plate 10, merely a circular aperture which is so dimensioned as to support the spherical bearing along a full circular line contact. Again, a conical seat would also give adequate support for the spherical bearing, achieving line contact therewith. The wording of the appended claims is intended to encompass the above modifications.

While preferred embodiments of this invention have been disclosed herein, those skilled in the art will appreciate that changes and modifications may be made therein without departing from the spirit and scope of this invention as defined in the appended claims.

What I claim as my invention is:
1. A bearing assembly comprising:
    a first member having a seat for a spherical bearing,
    a spherical bearing seated in said seat, said spherical bearing having a spherical surface where it is in contact with said seat and being provided with annular ledge means facing away from said seat,
    a second member located adjacent said bearing remote from said first member,
    a resilient, substantially annular member having a substantially circular inner periphery and seated on said bearing with said inner periphery engaging said annular ledge means, opposite halves of said substantially annular member being bent in the direction away from said first member such that the annular member bears resiliently against said second member at two separate antipodal locations on the outer periphery of the annular member to provide a first fulcrum and bears resiliently against said annular ledge means at two separate antipodal locations on the inner periphery of the annular member to provide a second fulcrum disposed at right-angles to said first fulcrum.
2. A bearing assembly as claimed in claim 1, in which said outer periphery is circular in curvature at said first-mentioned two antipodal locations.
3. A bearing assembly as claimed in claim 1, in which said annular ledge means comprises an annular groove provided in said bearing, such that the annular member seats directly against said bearing.
4. A bearing assembly as claimed in claim 1, in which said bearing has a spherical surface portion facing remotely from said first member, and in which said annular ledge means comprises a floating annular ledge seat bearing floatably against said spherical surface portion.
5. A bearing assembly as claimed in claim 1, in which said first and second members are plate members.
6. A bearing assembly as claimed in claim 1, in which said seat is a spherical seat having the same radius of curvature as the bearing, whereby surface contact is achieved between the seat and the bearing.
7. A bearing assembly as claimed in claim 6, in which said outer periphery is circular in curvature at said first-mentioned two antipodal locations.
8. A bearing assembly as claimed in claim 3, in which said first and second members are plate members, and in which said annular member is curved to define a substantially cylindrical surface.
9. A bearing assembly as claimed in claim 4, in which said first and second members are plate members, and in which said annular member is curved to define a substantially cylindrical surface.
10. A bearing assembly as claimed in claim 1, in which said annular member is curved to define a substantially cylindrical surface.

References Cited

UNITED STATES PATENTS

| 1,499,298 | 6/1924 | Eller | 308—72 |
| 1,592,020 | 7/1926 | Weston | 308—159 |
| 2,448,500 | 8/1948 | Turner | 308—72 |
| 2,664,697 | 1/1954 | Vuilleumier | 308—159 X |
| 2,886,380 | 5/1959 | Lambeek | 308—72 |
| 3,014,767 | 12/1961 | Thrasher | 308—72 |
| 3,070,409 | 12/1962 | Jakel | 308—72 |

FOREIGN PATENTS

| 513,811 | 6/1955 | Canada. |
| 936,778 | 9/1963 | Great Britain. |

MARTIN P. SCHWADRON, Primary Examiner

LUCIOUS L. JOHNSON, Assistant Examiner

U.S. Cl. X.R.

308—72, 140